United States Patent [19]

Rock

[11] Patent Number: 4,871,817
[45] Date of Patent: Oct. 3, 1989

[54] POLYETHERIMIDE-LIQUID CRYSTAL POLYMER BLENDS

[75] Inventor: John A. Rock, Becket, Mass.

[73] Assignee: General Electric Company, Pittsfield, Mass.

[21] Appl. No.: 948,046

[22] Filed: Dec. 31, 1986

[51] Int. Cl.[4] .................... C08L 67/00; C08L 79/08
[52] U.S. Cl. .................... 525/425; 525/432; 525/436; 525/907
[58] Field of Search .......... 525/425, 432, 436; 252/299.01, 299.6

[56] References Cited

U.S. PATENT DOCUMENTS

| | | | |
|---|---|---|---|
| 3,637,595 | 1/1972 | Cottis et al. | 260/47 C |
| 3,847,867 | 11/1974 | Heath et al. | 260/47 CP |
| 3,847,869 | 11/1974 | Williams, III | 260/47 CZ |
| 3,850,885 | 11/1974 | Takekoshi | 260/47 CZ |
| 3,852,242 | 12/1974 | White et al. | 260/47 CZ |
| 3,855,178 | 2/1974 | White et al. | 260/45.7 S |
| 3,962,314 | 6/1976 | Economy et al. | 260/473 S |
| 3,975,487 | 8/1976 | Cottis et al. | 264/210 F |
| 4,141,927 | 2/1979 | White et al. | 525/432 |
| 4,161,470 | 7/1979 | Calundann | 260/40 P |
| 4,250,279 | 2/1981 | Robeson et al. | 525/425 |
| 4,256,624 | 3/1981 | Calundann | 260/40 R |
| 4,386,174 | 5/1983 | Cogswell et al. | 524/27 |
| 4,417,044 | 11/1983 | Parekh | 528/179 |
| 4,439,578 | 3/1984 | Kim et al. | 525/425 |
| 4,460,735 | 7/1984 | Froix | 524/537 |
| 4,468,364 | 8/1984 | Ide | 264/211.12 |
| 4,540,737 | 9/1985 | Wissbrun et al. | 524/599 |
| 4,562,244 | 12/1985 | Yoon | 528/190 |
| 4,565,850 | 1/1986 | Provorsek | 525/425 |
| 4,567,227 | 1/1986 | Kiss | 525/425 |
| 4,600,765 | 7/1986 | Lee et al. | 528/193 |
| 4,614,790 | 9/1986 | Hutchings et al. | 528/191 |
| 4,614,791 | 9/1986 | Hutchings et al. | 528/193 |
| 4,639,486 | 1/1987 | Liu | 525/425 |
| 4,728,698 | 3/1988 | Isayev et al. | 525/439 |

OTHER PUBLICATIONS

Koton, M. M. and Florinski, F. S., *Zh. Org. Khin.*, 4(5):774 (1968).
"Dartco's preemptive strike," Nov. 14, 1984, *Chemical Week*, pp. 12–13.
"Technical Information Xydar," Dartco Mfg., Inc., Feb., 1985.
W. Brinrinegar, *Modern Plastics Encyclopedia*, 1985–1986, p. 42.

*Primary Examiner*—John C. Bleutge
*Assistant Examiner*—A. Carrillo
*Attorney, Agent, or Firm*—Bernard, Rothwell & Brown

[57] ABSTRACT

Disclosed are blends of (a) a polyetherimide and (b) a liquid crystal polymer. The liquid crystal polymer is an aromatic copolyester which exhibits melt anisotropy. The blends exhibit a higher heat distortion temperature higher flexural modulus and specific gravity over the polyetherimide component alone and have a higher tensile strength than that associated with the liquid crystal polymer alone.

19 Claims, No Drawings

POLYETHERIMIDE-LIQUID CRYSTAL POLYMER BLENDS

This invention relates to a class of polymer blends containing a polyetherimide and a liquid crystal polymer. The blends exhibit higher heat distortion temperatures, improved flexural strengths and tensile strengths over the polyetherimide component alone and are more easily processed at lower temperatures than the liquid crystal polymer component of the blends. In addition, the blends exhibit excellent solvent resistance.

The blends of the invention include a polyetherimide of the formula:

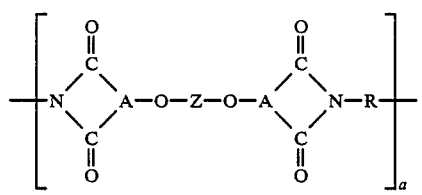

where "a" represents a whole number in excess of 1, i.e., 10 to 10,000 or more, the group —O—A< is selected from:

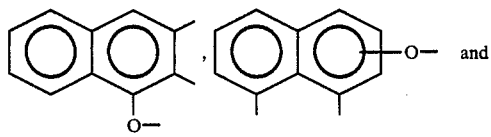

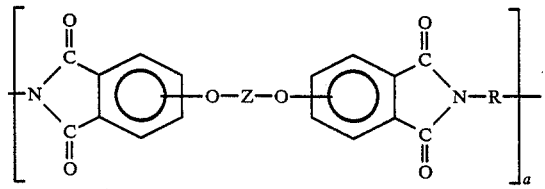

wherein R' is hydrogen, lower alkyl or lower alkoxy. Preferably the polyetherimide includes the latter —O—A< group where R' is hydrogen such that the polyetherimide is of the formula

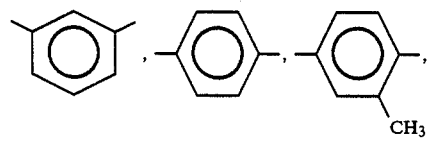

and the divalent bonds of the —O—Z—O— radical are in the 3,3'; 3,4'; 4,3' or the 4,4' position; Z is a member of the class consisting of (1)

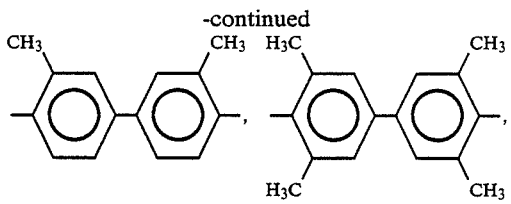

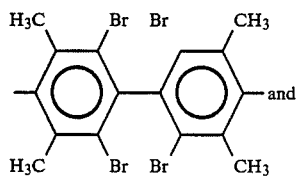

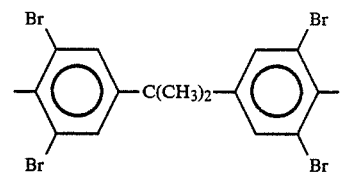

and (2) divalent organic radicals of the general formula:

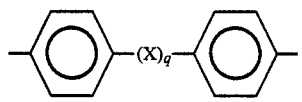

where X is a member selected from the class consisting of divalent radicals of the formulas,

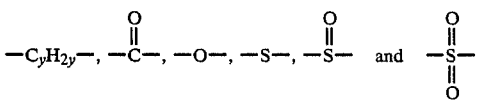

where q is 0 or 1, y is a whole number from 1 to 5; and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2–20 carbon atoms, $C_{(2-8)}$ alkylene terminated polydiorganosiloxanes, and (3) divalent radicals included by the formula

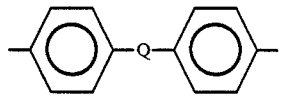

where Q is a member selected from the class consisting of

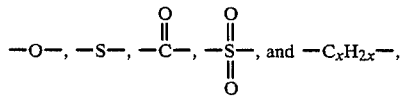

and x is a whole number from 1 to 5 inclusive. Particularly preferred polyetherimides for the purposes of the present invention include those where —O—A< and Z respectively are:

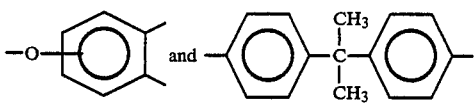

and R is selected from;

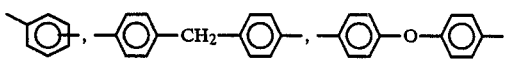

The polyetherimides where R is metaphenylene are most preferred.

Liquid crystal polymers for use in the blends of the present invention can be defined generally as aromatic polyesters which exhibit melt anisotropy. The liquid crystal polymer commonly exhibits a weight average molecular weight of about 2000 to 200,000, more preferably 3500 to 50,000 and most preferably 4,000 to 30,000.

A particularly preferred class of liquid crystal polymers is disclosed in U.S. Pat. No. 3,637,595. These polymers are oxybenzoyl copolyesters comprising varying proportions of repeating units of the Formulas I, II and III,

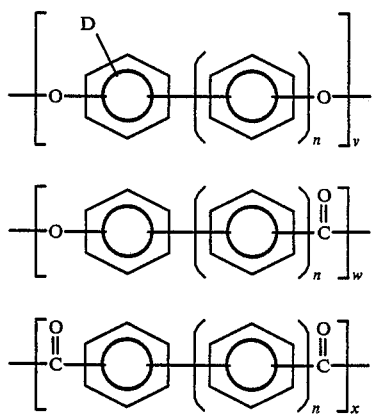

wherein n is 0 or 1 and v, w and x are integers greater than 1 and D is selected from the group consisting o hydrogen, an alkyl radical having 1 to 4 carbon atoms, an aryl radical having 6 to 10 carbon atoms, alkaryl radical having 6 to 10 carbon atoms or halogen radical. Preferably, the sum of v, w and x equals 30 to 600. The oxybenzoyl copolyester generally comprises from about 0.6 to about 60 mole percent of the moieties of Formula I, from about 0.4 to about 98.5 mole percent of the moieties of Formula II and from about 1.0 to about 60 mole percent of the moieties of Formula III. Preferably, the oxybenzoyl copolyester comprises from about 8 to about 48 mole percent of the moieties Formula I, from about 5 to about 85 mole percent of the moieties of Formula II and from about 8 to about 48 mole percent of the moieties of Formula III.

Examplary of materials from which the moieties of Formula I may be obtained are p,p'-biphenol; p,p'-oxybisphenol; 4,4'-dihydroxybenzophenone; resorcinol; phenyl hydroquinone; phenyl ethyl hydroquinine; phenyl propyl hydroquinine; phenyl butyl hydroquinine; chlorohydroquinine; hydroquinone or mixtures thereof. Examples of sources from which the moiety of Formula II may be obtained include p-hydroxybenzoic acid; phenyl-p-hydroxybenzoate; p-acetoxybenzoic acid; isobutyl-p-acetoxybenzoate or mixtures thereof. Among the sources from which the moiety of Formula III may be obtained include terephthalic acid; terephthaloyl chloride; isophthalic acid; isophthaloyl chloride; diphenyl terephthalate; diethyl isophthalate; methylethyl terephthalate; the isobutyl half ester of terephthalic acid or mixtures thereof.

Commercial liquid crystal polymers comprising repeating units of Formula I-III include Xydar ™ injection molding resins from Dartco Manufacturing Co. of Augusta, Ga., 30906. Xydar injection molding resins are polyesters prepared from terephthalic acid, biphenol, and p-hydroxybenzoic acid.

Liquid crystal polymers containing moieties of Formulas I-III have very high processing temperatures. The melt temperatures of these polymers range from about 700° F. to about 900° F. When these liquid crystal polymers are molded, mold temperatures of 200° F. to 500° F. and pressures of 5000 to 14,000 psi are preferred.

The liquid crystal polymer may also contain the repeating moieties of Formulas I and III. These liquid crystal polymers generally comprise 40 to 60 mole percent of the moieties of Formula I and from 60 to 40 mole percent of the moieties of Formula III. Preferably, the molar ratio of the moieties of Formula I and III are 50:50. Exemplary of these liquid crystal polymers are the polymers taught in U.S. Pat. Nos. 4,600,765, 4,614,790 and 4,614,791. These patents are incorporated by reference herein. In a particularly preferred liquid crystal polymer having repeating units of Formulas I and III, the moiety of Formula I is derived from an equal molar mixture of phenyl-hydroquinone and phenyl ethyl hydroquinone and the moiety of Formula III is derived from terephthaloyl chloride.

Another preferred liquid crystal polymer for use in the blends of this invention is disclosed in U.S. Pat. No. 4,161,470. These polymers are described as naphthoyl copolyesters comprising repeating units of Formulas IV and V,

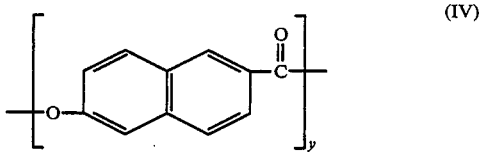

and

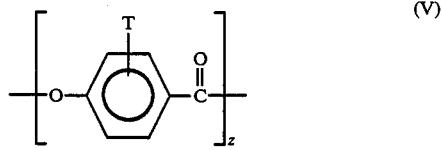

wherein y and z are integers greater than 1 and T is selected from the class consisting of hydrogen, an alkyl radical having 1 to about 4 carbon atoms, an alkoxy radical of 1 to about 4 carbon atoms, a halogen radical or mixtures thereof. The copolyesters comprise approximately 10 to 90 mole percent of the moieties of Formula IV and 90 to 10 mole percent of the moieties of Formula V. Preferably, the naphthoyl copolyester comprises from about 25 to 45 mole percent of Formula IV and from about 85 to 55 mole percent of Formula V. Exemplary of materials from which the moieties of Formula IV may be obtained are 6-hydroxy-2-naphthoic acid and p-acetoxybenzoic acid. As can be appreciated, those materials from which moieties of Formula V may be prepared are inclusive of some of the materials listed for Formula II above since Formula V is the same as Formula II when n in Formula II equals 0 and T of Formula V is hydrogen.

Commercial liquid crystal polymers comprising repeating units of Formulas IV and V include Vectra TM high performance resins from Celanese Specialty Operations. Vectra resins are primarily aromatic polyesters based on p-hydroxybenzoic acid and 6-hydroxy-2-naphthoic acid monomers. These naphthoyl-based copolyesters have lower processing temperatures than the oxybenzoyl copolymers of Formulas I–III. The melt temperatures of the naphthoyl-based copolyesters generally range from about 545° F. to about 620° F. with mold temperatures between about 130° F. and about 300° F.

The liquid crystal polymers which are used to form the present blends are virtually unaffected by organic solvents, acids in concentrations up to 90% and bases in concentrations up to 50%. The liquid crystal polymers do not stress-crack under load when exposed to organic solvents, such as aromatic solvents, ethers, ketones, aldehydes, acids or halogenated materials.

The polyetherimides that are used to form the novel blends can be obtained by any of the methods well known to those skilled in the art including the reaction of any aromatic bis(ether anhydrides) of the formula

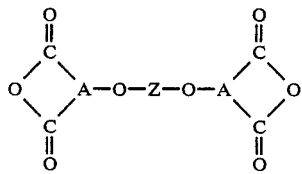

where A and Z are as defined hereinbefore, with an organic diamine of the formula

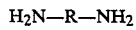

where R is as defined hereinbefore. Aromatic bis(ether anhydrides)s of the above formula include, for example,
2,2-bis[4-(2,3-dicarboxyphenoxy)-phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)-diphenyl-2,2-propane dianhydride; and mixtures of such dianhydrides.

In addition, aromatic bis(ether anhydride)s also included by the above formula are shown by Koton, M. M.; Florinski, F. S.; Bessonov, M. I.; 1 Rudakov, A. P. (Institute of Heteroorganic Compounds, Academy of Sciences, U.S.S.R.), U.S.S.R. 257,010, Nov. 11, 1969, Appl. May 3, 1967. Also, dianhydrides are shown by M. N. Koton, F. S. Florinski, Zh Org. Khin., 4(5), 774 (1968).

Organic diamines of the above formula include, for example, m-phenylenediamine, p-phenylenediamine, 4,4'-diaminodiphenyl propane,
4,4'-diaminodiphenylmethane, benzidine,
4,4'-diaminodiphenyl sulfide, 4,4'-diaminodiphenylsulfone, 4,4'-diaminodiphenyl ether,
1,5-diaminoaphthalene, 3,3'-dimethylbenzidine,
3,3'-dimethoxybenzidine,
2,4-bis(β-amino-t-butyl)-toluene,
bis(p-β-amino-t-butylphenyl)ether,
bis(p-β-methyl-o-aminophenyl)benzene,
1,3-diamino-4-isopropylbenzene,
1,2-bis(3-aminopropoxy)ethane, m-xylylenediamine,
p-xylylenediamine, 2,4-diaminotoluene,
2,6-diaminotoluene, bis(4-aminocyclohexyl)methane,
3-methylheptamethylenediamine,
4,4-dimethylheptamethylenediamine, 2,11-dodecanediamine,
2,2-dimethylpropylenediamine, octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine, 1,4-cyclohexanediamine,
1,12-octadecanediamine, bis(3-aminopropyl)sulfide,
N-methyl-bis(3-aminopropyl)amine, hexamethylenediamine,
heptamethylenediamine, nonamethylenediamine,
decamethylenediamine,
bis(3-aminopropyl)tetramethyldisiloxane,
bis(4-aminobutyl)tetramethyldisiloxane, and the like, and mixtures of such diamines.

Included among the many methods of making the polyetherimides are those disclosed in U.S. Pat. Nos. Heath et al. 3,847,867, Williams 3,847,869, Takekoshi et al. 3,850,885, White 3,852,242 3,855,178 and Parekh 4,417,044. These disclosures are incorporated herein in their entirety by reference for the purpose of teaching, by way of illustration, general and specific methods for preparing polyetherimides suitable for the blends of this invention. Preferably, the method of making the polyetherimides disclosed in Parekh U.S. Pat. No. 4,417,044 is used.

Reactions between the various starting materials for the production of the liquid crystal polymers may be effected in manners taught in the U.S. Pat. Nos. 3,637,595 and 4,161,470. Thus, random, block or highly ordered copolymers may be synthesized by a wide variety of processes, including simultaneous or sequential reactions of the starting compounds at suitable temperatures, and optionally in the presence of suitable catalysts. The starting materials which result in the various moieties of the liquid crystal polymer can be simultaneously charged to a reaction zone. Alternatively, for the oxybenzoyl copolyesters containing repeating units of Formulas I–III, a source of a moiety of Formula II can be reacted with a similar source of Formula I and the reaction product can be further reacted with a source of Formula III. However, if sequential addition is to be employed it is normally preferred that the source of Formula II is first reacted with the source of Formula III, after which the reaction product may be further reacted with the source of Formula I. Also, two or more sources of Formula II may be reacted with each other first, followed by reaction with two or more sources of Formula III and later the product may be further reacted with the source of Formula I. By such products, liquid crystal polymers having randomly recurring or regularly recurring structural units are produced.

The various condensation reactions will normally be carried out at an elevated temperature, generally from 50° to 400° C. Initial reaction of a p-hydroxybenzoic acid type of material with itself or a source of the dicarbonyl structure of Formula III, or a source of the dioxy structure of Formula I, is facilitated by the presence and participation in the reaction of a monoester, preferably a phenyl ester of benzoic acid or a lower alkanoic acid, such as acetic acid. By "lower" is meant from 1 to 6 carbon atoms, preferably 1 to about 4 carbon atoms and most preferably 1 to 2 carbon atoms, e.g. acetic. The monoester may join to terminal groups of the hydroxybenzoic acid and will facilitate condensation of such material with itself and with other carboxylic- or hydroxy-terminated starting materials, resulting in comparatively low boiling by-products which are comparatively easily removed from the condensation reaction product. Preferred temperatures for condensation of a hydroxybenzoic acid and a dicarbonyl starting material will normally be from about 50° to 220° C., preferably from about 160° to about 200° C.

Catalysts for this reaction, which are not necessary but may be advantageously employed, include gaseous acid catalysts such as Lewis acids and hydrogen halides, preferably hydrogen chloride. Condensation reactions of the resulting product with a bisphenol or such type of reactant can be conducted at about 200° to about 400° C., preferably at about 250° C. to about 350° C. Transesterification catalysts which may be employed in such reactions include sodium alkoxides, titanium alkoxides, such as tetra-n-butyl orthotitante, sodium titanium alkoxides, lithium hydroxide, alkaline earth metal salts of carboxylic acids and p-toluenesulfonic acid. Acetic anhydride is useful as an acetylating agent to convert the hydroxyl groups on the reactive monomers to acetoxy groups and other anhydrides may be employed to produce other lower alkanoyloxy, benzoyloxy and similar groups. Converting the hydroxyl groups to reacting anhydrides aids in subsequent condensation reactions, helping them to go to completion at lower temperatures and with lower probabilities of degradation of the monomers and polymers. The reactive anhydrides faciliate ultimate condensation and produce readily removable by-products.

The described reactions can be conducted in the presence of a liquid heat transfer medium having a high boiling point but are preferably carried out in a melt phase. Examplary of the heat transfer media are the terphenyls, mixtures of polychlorinated polyphenyls such as chlorinated biphenyls typified by those commercially available under the trademark Thermino FR, and polyaromatic ethers and mixtures thereof having boiling ranges which are over 400° C., typical of which is Therminol 77.

In accordance with the present invention, blends of a polyetherimide and a liquid crystal polymer are generally obtainable in all proportions of the polymers relative to each other. Thus, the polyetherimide and liquid crystal polymer components of the blend may be mixed in weight ratios of 1:99 to 99:1 relative to each other. Preferably, the polyetherimide-liquid crystal polymer blend comprises from about 50 to about 95 weight percent of polyetherimide and from about 5 to about 50 weight percent of liquid crystal polymer. By controlling the proportions of the components of the blend relative to each other, blends having certain predetermined useful properties which are improved over those of certain components alone may be readily obtained. In general, blends of the subject invention may exhibit depending on the blend ratio of the components, one or more of the properties of high tensile and/or flexural strengths, good impact strengths and high heat distortion temperatures.

It is contemplated that the blends of the present invention may also include other additive materials such as fillers, stabilizers, plasticizers, flexibilizers, surfactant agents, pigments, dyes, reinforcement, flame retardants and diluents in conventional amounts. It is also contemplated that the blends of the invention may include two or more polyetherimides in combination with one or more liquid crystal polymers or two or more liquid crystal polymers in combination with one or more polyetherimides.

Methods for forming blends of the present invention may vary considerably. Prior art blending techniques are generally satisfactory. A preferred method comprises blending the polymers and additives such as reinforcements in powder, granular or filamenous form, extruding the blend, and chopping the extrudate into pellets suitable for molding by means conventionally used to mold normally solid thermoplastic compositions. Another method comprises blending filaments of the liquid crystal polymer with a polyetherimide at a temperature below the Tg of the liquid crystal polymer so that the fibrous network of liquid crystal polymer is permeated and surrounded by polyetherimide. The liquid crystal polymer should be thoroughly dried prior to any processing to prevent hydrolysis or gassing during processing. It is preferred that the liquid crystal polymer be ground into a fine powder for use of blending. Four to eight hours at 300° to 325° F. in dry air or vacuum oven before use is preferred.

The subject blends have application in a wide variety of physical shapes and forms, including the use as films, molding compounds, coatings, etc. When used as films or when made into molded products, these blends, including laminated products prepared therefrom, not only possess good physical properties at room temperature but they retain their strength and excellent response to workloading at elevated tempratures for long periods of time. Films formed from the blends of this invention may be used in application where films have been used previously. Thus, the blends of the present invention can be used in automobile and aviation applications for decorative and protective purposes, and as high temperature electrical insulation for motor slot liners, transformers, dielectyric, capacitors, cable and coil wrappings (form wound coil insulation for motors), and for containers and container linings. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Films made from the subject blends can also serve in printed circuit applications.

Other applications which are contemplated for these blends include their use as binders for asbestos fibers, carbon fibers, and other fibrous materials in making brake linings. In addition, molding compositions and molded articles may be formed form the polymer blends of the invention by incorporating such fillers as asbestos, glass fibers, talc, quartz, powder, finely divided carbon, and silica into the blends prior to molding. Shaped articles may be molded under heat, or under heat and pressure, in accordance with practices well-known in the art.

The following examples illustrate specific polyetherimide liquid crystal polymer blends in accordance with the present invention. It should be understood that the examples are given for the purpose of illustration and do not limit the invention. In the examples, all parts and percentages are by weight unless otherwise specified.

EXAMPLES 1-10

A series of blends of a polyetherimide resin (Ultem ® 1000 from General Electric Company) and a liquid crystal polymer (Xydar SRT 300 obtained from Dartco Manufacturing Co.) were extruded in a 28 mm Werner Pfleiderer twin screw extruder. The extrudate was chopped into pellets and injection molded. The mold temperature for all the extrudate examples was 355° F. except the mold temperature for Examples 5 and 7 was 460° F. The molded specimens were then evaluated to determine standard mechanical properties.

The tables below list the properties of each component of the blend as well as the resulting properties for each blend.

| Extrudate Sample | % Polyetherimide | % LCP | Notched Izod Impact 0.125" bar (ft. lbs/in) | Reversed Notched Impact (ft.lbs/in) |
|---|---|---|---|---|
| 1 | 100 | 0 | — | — |
| 2 | 95 | 5 | 0.7 | 8.8 |
| 3 | 90 | 10 | 0.9 | 7.4 |
| 4 | 75 | 25 | 0.8 | 4.3 |
| 5 | 75 | 25 | 0.5 | 5.2 |
| 6 | 50 | 50 | 0.6 | 1.7 |
| 7 | 50 | 50 | 0.5 | 1.8 |
| 8[1] | 25 | 75 | — | — |
| 9[2] | 0 | 100 | 1.7 | 3.4 |
| 10[3] | 0 | 100 | — | — |

| Extrudate Sample | % Polyetherimide | % LCP | Flexural Properties (0.25"bar) | | |
|---|---|---|---|---|---|
| | | | Initial Modulus (Mpsi) | Strength at 5% Strain (PSI) | Ultimate Strength (PSI) |
| 1 | 100 | 0 | 412 | 18,300 | 21,400 |
| 2 | 95 | 5 | 470 | 18,700 | 21,100 |
| 3 | 90 | 10 | 452 | 17,400 | 19,700 |
| 4 | 75 | 25 | 461 | 16,400 | 16,700 |
| 5 | 75 | 25 | 455 | 16,200 | 16,400 |
| 6 | 50 | 50 | 624 | — | 9,500 |
| 7 | 50 | 50 | 645 | — | 11,500 |
| 8[1] | 25 | 75 | — | — | — |
| 9[2] | 0 | 100 | 1533 | — | 12,600 |
| 10[3] | 0 | 100 | 1595 | — | 13,200 |

-continued

| Extrudate Sample | % Polyetherimide | % LCP | Tensile Properties | | |
|---|---|---|---|---|---|
| | | | Tensile Strength (PSI) | Tensile Yield Elongation (%) | Tensile Elongation Ultimate (%) |
| 1 | 100 | 0 | 15,200 | 7.5 | 84.0 |
| 2 | 95 | 5 | 13,800 | 6.8 | 8.2 |
| 3 | 90 | 10 | 12,300 | 6.5 | 7.9 |
| 4 | 75 | 25 | 9,800 | — | 4.0 |
| 5 | 75 | 25 | 10,300 | — | 4.1 |
| 6 | 50 | 50 | 8,000 | — | 1.5 |
| 7 | 50 | 50 | 8,900 | — | 2.3 |
| 8[1] | 25 | 75 | — | — | — |
| 8[1] | 25 | 75 | — | — | — |
| 9[2] | 0 | 100 | 7,100 | — | 1.0 |
| 10[3] | 0 | 100 | 9,400 | — | 1.0 |

| Extrudate Sample | % Polyetherimide | % LCP | Specific Gravity | HDT at 264 psi (°C.) |
|---|---|---|---|---|
| 1 | 100 | 0 | 1.27 | 200 |
| 2 | 95 | 5 | 1.29 | 197 |
| 3 | 90 | 10 | 1.29 | 196 |
| 4 | 75 | 25 | 1.30 | 195 |
| 5 | 75 | 25 | — | — |
| 6 | 50 | 50 | 1.33 | 206 |
| 7 | 50 | 50 | — | — |
| 8[1] | 25 | 75 | — | — |
| 9[2] | 0 | 100 | 1.34 | >240 |
| 10[3] | 0 | 100 | — | — |

[1]Did not obtain injection molded parts adequate for testing.
[2]The liquid crystals polymer of extrudate sample 9 was dried for 4 hours at 300° F. prior to injection molding.
[3]The liquid crystals polymer of extrudate sample 10 was dried for 10 hours at 300° F. prior to injection molding.

While the present invention has been described with reference to particular embodiments thereof, it will be understood that numerous modifications may be made by those skilled in the art without actually departing from the spirit and scope of the invention as defined in the appended claims.

We claim:

1. A composition comprising a blend of a polyetherimide and (b) liquid crystal polymer which exhibits melt anisotropy wherein the liquid crystal polymer is a copolyester having recurring moieties of Formulas I and III or of Formulas I, II and III or of Formulas IV and V,

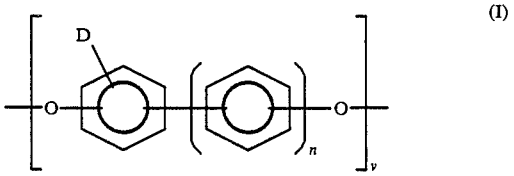

(I)

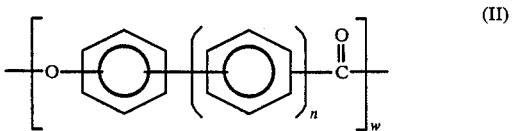

(II)

(III)

-continued

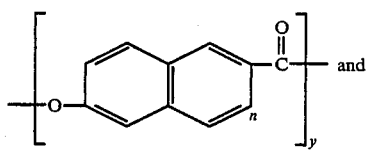 (IV)

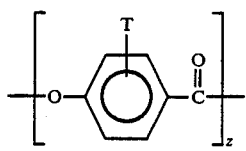 (V)

wherein n is 0 or 1 and v, w, x, y, and z are integers greater than 1 and D is selected from the class consisting of hydrogen, an alkyl radical having 1 to 4 carbon atoms, an aryl radical having 1 to 4 carbon atoms, an aryl radical having 6 to 10 carbon atoms, an alkaryl radical having 6 to 10 carbon atoms or a halogen radical and T is selected from the class consisting of hydrogen, an alkyl radical having 1 to 4 carbon atoms, an alkoxy radical of 1 to 4 carbon atoms, halogen radical or mixtures thereof wherein Formula I of said copolyester having recurring moieties of Formula I and III is derived from at least phenyl ethyl hydroquinone.

2. A composition in accordance with claim 1 wherein the liquid crystal polymer is a copolyester having recurring moieties of Formula I, II and III.

3. A composition in accordance with claim 1 wherein n in Formula I is 1 and n in Formula II and III is 0.

4. A composition in accordance with claim 2 wherein the copolyester comprises from about 0.6 to about 60 mole percent of the moieties of Formula I, from about 0.4 to about 98.5 mole percent of the moieties of Formula II and from about 1 to about 60 mole percent of the moieties of Formula III.

5. A composition in accordance with claim 4 wherein the copolyester comprises from about 8 to about 48 mole percent of the moieties of Formula I, from about 5 to about 85 mole percent of the moieties of Formula II and from about 8 to about 48 mole percent of the moieties of Formula III.

6. A composition in accordance with claim 1 wherein the liquid crystal polymer is a copolyester having recurring moieties of Formula IV and V.

7. A composition in accordance with claim 6 wherein said copolyester comprises from about 10 to about 90 mole percent of the moieties of Formula IV and from about 90 to about 10 mole percent of the moieties of Formula V.

8. A composition in accordance with claim 7 wherein said copolyester comprises from about 25 to about 45 mole percent of the moieties of Formula IV and from about 75 to about 55 mole percent of the moieties of Formula V.

9. A composition in accordance with claim 1 wherein the liquid crystal polymer is a copolymer having recurring moieties of Formula I and III.

10. A composition in accordance with claim 9 wherein said copolyester comprises from about 40 to 60 mole percent of the moieties of Formula I and 60 to 40 mole percent of the moieties of Formula III.

11. A composition in accordance with claim 10 wherein said copolyester comprises from about 50 mole percent of the moieties of Formula I and 50 percent of the moieties of Formula III.

12. A composition in accordance with claim 1 wherein the composition is from about 1 to 99 percent by weight of a polyetherimide and from about 99 to about 1 percent by weight of liquid crystal polymer.

13. A composition in accordance with claim 9 wherein the composition is from about 50 to about 95 percent by weight of a polyetherimide and from about 5 to about 50 percent by weight of a liquid crystal polymer.

14. A composition in accordance with claim 1, wherein the polyetherimide has the formula:

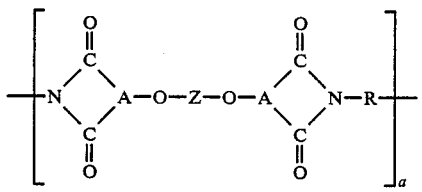

where a represents a whole number in excess of 1, the group —O—A is selected from:

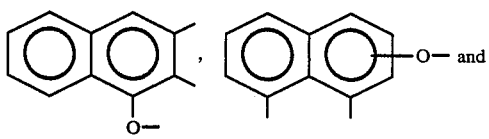

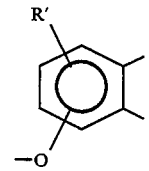

R' being hydrogen, lower alkyl or lower alkoxy, and Z is a member of the class consisting of (1)

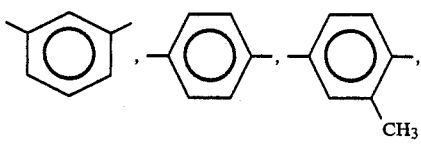

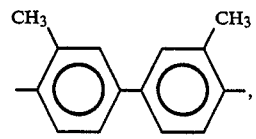

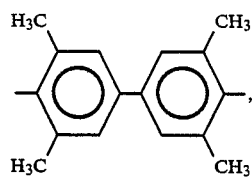

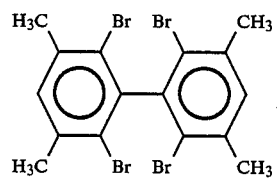

-continued
and

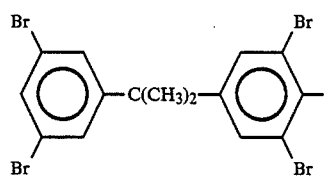

and (2) divalent organic radicals of the general formula:

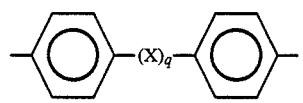

where X is a member selected from the class consisting of divalent radicals of the formula,

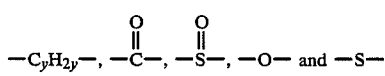

where q is 0 or 1, y is a whole number from 1 to 5, and R is a divalent organic radical selected from the class consisting of (1) aromatic hydrocarbon radicals having from 6 to about 20 carbon atoms and halogenated derivatives thereof, (2) alkylene radicals and cycloalkylene radicals having from 2–20 carbon atoms, $C_{(2-8)}$ alkylene terminated polydiorganosiloxanes, and (3) divalent radicals included by the formula:

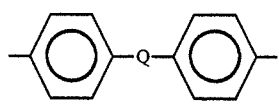

where Q is a member selected from the class consisting of

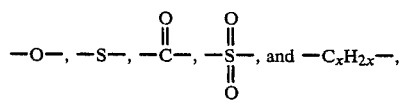

and x is a whole number from 1 to 5 inclusive.

15. A composition in accordance with claim 14 wherein the polyetherimide is of the formula:

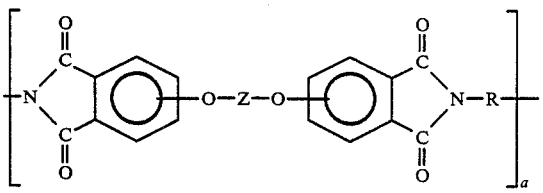

and the divalent bonds of the —O—Z—O— radicals are in the 3,3'; 3,4'; 4,3' or the 4,4' position.

16. A composition in accordance with claims 15, wherein Z is;

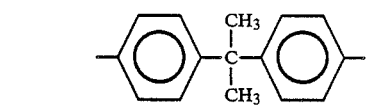

and R is selected from;

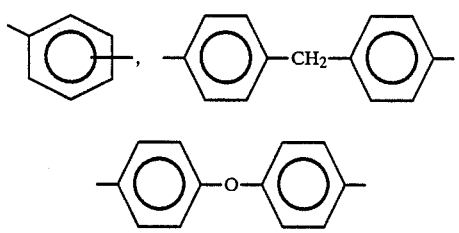

17. A composition in accordance with claim 16 wherein the polyetherimide is of the formula;

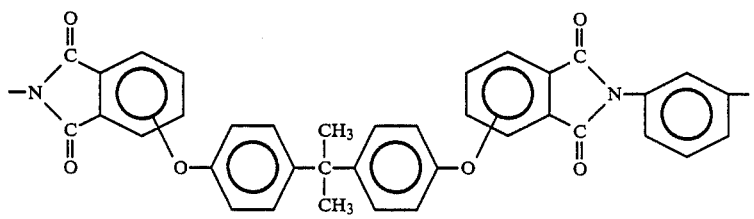

18. A composition consisting essentially of a blend of (a) a polyetherimide and (b) a liquid crystal polymer which exhibits melt anisotropy wherein the liquid crystal polymer is a copolyester having recurring moieties of Formulas I and III or of Formulas I, II and III or of Formulas IV and V,

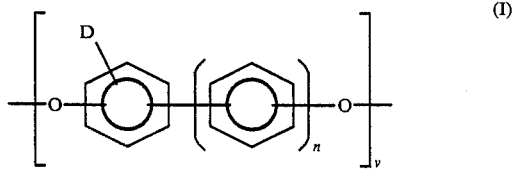 (I)

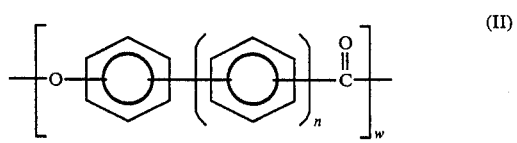 (II)

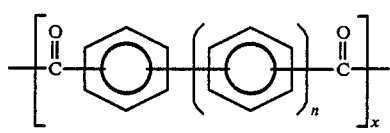

(III)

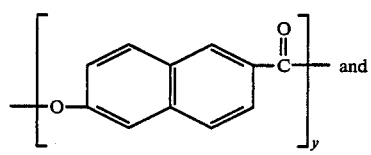

(IV)

and

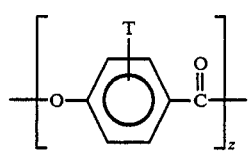

(V)

wherein n is 0 or 1 and v, w, x, y, and z are integers greater than 1 and D is selected from the class consisting of hydrogen, an alkyl radical having 1 to 4 carbon atoms, an aryl radical having 1 to 4 carbon atoms, an aryl radical having 6 to 10 carbon atoms, alkaryl radical having 6 to 10 carbon atoms or halogen radical and T is selected from the class consisting of hydrogen, an alkyl radical having 1 to 4 carbon atoms, an alkoxy radical of 1 to 4 carbon atoms, halogen radical or mixtures thereof, wherein Formula I of said copolyester having recurring moieties of Formula I and III is derived from at least phenyl ethyl hydroquinone.

19. A composition consisting essentially of a blend of (a) a polyetherimide and (b) a liquid crystal polymer which exhibits melt anisotropy wherein the liquid crystal polymer is a copolyester having recurring moieties of Formulas I and III or of Formulas I, II and III or of Formulas IV and V,

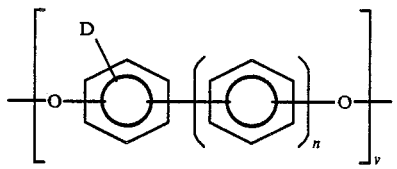

(I)

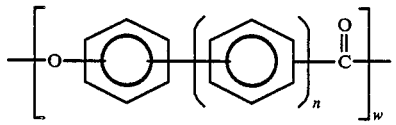

(II)

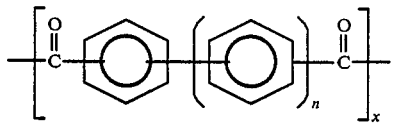

(III)

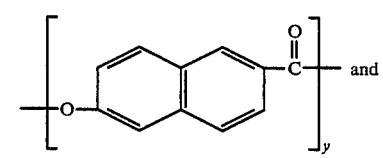

(IV)

and

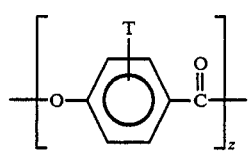

(V)

wherein n is 0 or 1 and v, w, x, y, and z are integers greater than 1 and D is selected from the class consisting of hydrogen, an alkyl radical having 1 to 4 carbon atoms, an aryl radical having 1 to 4 carbon atoms, an aryl radical having 6 to 10 carbon atoms, alkaryl radical having 6 to 10 carbon atoms or halogen radical and T is selected from the class consisting of hydrogen, an alkyl radical having 1 to 4 carbon atoms, an alkoxy radical of 1 to 4 carbon atoms, halogen radical or mixtures thereof, wherein Formula I of said copolyester having recurring moieties of Formula I and III is derived from at least phenyl ethyl hydroquinone and wherein said polyetherimide does not contain ester linkages between adjoining etherimide groups.

* * * * *

UNITED STATES PATENT AND TRADEMARK OFFICE
CERTIFICATE OF CORRECTION

PATENT NO. : 4,871,817

DATED : October 3, 1989

INVENTOR(S) : John A. ROCK and Daniel E. FLORYAN

It is certified that error appears in the above-identified patent and that said Letters Patent is hereby corrected as shown below:

Cover page, [75] insert -- Daniel E. Floryan -- (additional inventor);

Column 1, line 47, after "formula" insert -- : --;

Column 2, line 25, delete "and" before "(2)";

Column 3, line 60, delete "Examplary" and substitute therefor -- Exemplary --;

Column 6, line 10, delete "4(5)" and substitute therefor -- $\underline{4}$(5) --;

Column 7, line 42, in both instances, delete "." after "C";

Column 8, line 47, delete "." after "F";

Column 10, line 13, delete the line in its entirety (double entry);

Claim 1, line 1, insert --(a) -- after "of";

UNITED STATES PATENT AND TRADEMARK OFFICE
CERTIFICATE OF CORRECTION

PATENT NO. : 4,871,817

DATED : October 3, 1989

INVENTOR(S) : John A. ROCK and Daniel E. FLORYAN

It is certified that error appears in the above-identified patent and that said Letters Patent is hereby corrected as shown below:

Claim 4, Line 2, delete "0.6" and substitute therefor -- .6 --;

Claim 4, line 4, delete "0.4" and substitute therefor -- .4 --.

Signed and Sealed this

Twenty-third Day of July, 1991

Attest:

HARRY F. MANBECK, JR.

*Attesting Officer*  *Commissioner of Patents and Trademarks*